US010009234B2

(12) United States Patent
Blondeau et al.

(10) Patent No.: US 10,009,234 B2
(45) Date of Patent: Jun. 26, 2018

(54) PREDICTIVE MODELING OF RISK FOR SERVICES IN A COMPUTING ENVIRONMENT

(71) Applicant: International Business Machines Corporation, Armonk, NY (US)

(72) Inventors: Randall W. Blondeau, Niwot, CO (US); Steven J. Mazzuca, New Paltz, NY (US); David M. Northcutt, Chester, NJ (US); Daniel S. Riley, Durham, NC (US); Michael H. Roehl, New Fairfield, CT (US); George E. Stark, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/945,823

(22) Filed: Nov. 19, 2015

(65) Prior Publication Data
US 2017/0149627 A1    May 25, 2017

(51) Int. Cl.
*H04L 12/24* (2006.01)
*H04L 12/26* (2006.01)
*G06F 9/38* (2018.01)
*G06F 9/455* (2018.01)

(52) U.S. Cl.
CPC .......... *H04L 41/5016* (2013.01); *G06F 9/455* (2013.01); *H04L 41/147* (2013.01); *H04L 41/5006* (2013.01); *H04L 41/5025* (2013.01); *H04L 41/5032* (2013.01); *H04L 41/5077* (2013.01); *H04L 43/106* (2013.01)

(58) Field of Classification Search
CPC ... H04L 41/5025; H04L 41/147; H04L 41/50; H04L 41/5003; H04L 41/5009; H04L 43/16
USPC ................. 709/220, 221, 223, 224
See application file for complete search history.

(56) References Cited

U.S. PATENT DOCUMENTS

| 7,933,814 | B2  |    | 4/2011  | Castellanos et al. |
| 8,041,797 | B2  |    | 10/2011 | Childress et al. |
| 8,175,254 | B2  | *  | 5/2012  | Li ........................ G06Q 10/06 379/265.08 |
| 9,069,611 | B2  |    | 6/2015  | Jackson |
| 2004/0261116 | A1 | * | 12/2004 | Mckeown ........... H04L 12/2801 725/109 |
| 2010/0274637 | A1 | * | 10/2010 | Li ........................ G06Q 10/06 379/265.06 |

(Continued)

*Primary Examiner* — Edward Kim
(74) *Attorney, Agent, or Firm* — Heslin Rothenberg Farley & Mesiti P.C.

(57) ABSTRACT

A method includes obtaining, by one or more processor, data related to a service level agreement for a service from a provider, wherein the service includes providing, to a client, network resources from a shared pool of network resources in a computing environment. The one or more processor utilizes the data to generate input parameters and these input parameters include target parameters for the service level agreement, penalty parameters for the service level agreement, and statistical process control parameters. The one or more processor analyzes the input parameters to model risk associated with probability of failure of the service from the provider in a given computing environment and generates and based on the risk model, allocating, by the one or more processor, a portion of the network resources.

20 Claims, 9 Drawing Sheets

(56) References Cited

U.S. PATENT DOCUMENTS

| | | | | |
|---|---|---|---|---|
| 2010/0280861 A1* | 11/2010 | Rossen | ................. | G06Q 10/00 |
| | | | | 705/7.28 |
| 2011/0231552 A1* | 9/2011 | Carter | ................... | G06F 9/5072 |
| | | | | 709/226 |
| 2012/0084443 A1* | 4/2012 | Theimer | ............. | G06F 9/45533 |
| | | | | 709/226 |
| 2012/0096165 A1* | 4/2012 | Madduri | ............... | G06F 9/5011 |
| | | | | 709/226 |
| 2012/0259962 A1* | 10/2012 | Bose | ....................... | H04L 41/50 |
| | | | | 709/223 |
| 2013/0097304 A1* | 4/2013 | Asthana | ............. | H04L 41/5025 |
| | | | | 709/224 |
| 2013/0268861 A1* | 10/2013 | Bailey | ................... | G06F 9/5072 |
| | | | | 715/735 |

* cited by examiner

500

510

Program code obtains attributes of an SLA defining the benchmarks required to meet the SLA.

520

Program code obtains historical performance data related to the given service for a predefined period of time.

530

Program code obtains data related to any contractual penalty liability for the SLA.

540

Program code identifies the capabilities of a supplier of the service.

550

Program code creates a risk model based on the process capabilities and the contractual penalty liability.

560

Program code utilizes the model to quantify the risk of the SLA.

FIG. 5

| 710 | 720 | 730 SLA Attainment Mean for the latest period. | 740 | 750 | 760 | If up is good it's a target. If down is good it's a limit. |
|---|---|---|---|---|---|---|
| The SLA Number or Reference ID | The amount at risk each month. | | Upper Natural Process Limit | Lower Natural Process Limit | Minimum Target | |
| SLA Number or Reference | SLA Penalty Assessment (Monthly) | SLA Attainment Mean | UNPL | LNPL | VoC Target | Is the VoC a Target or Limit |
| SL01 | $14,737.05 | 1.26% | 1.65% | 0.88% | 5.000% | Limit |
| SL02 | $12,503.14 | 100.00% | 100.00% | 100.00% | 100.000% | Target |
| SL04a | $11,789.64 | 99.49% | 100.00% | 98.84% | 95.000% | Target |
| SL04b | $11,789.64 | 98.20% | 100.00% | 96.23% | 95.000% | Target |
| SL07 | $14,737.05 | 100.00% | 100.00% | 100.00% | 99.900% | Target |
| SL16 | $14,737.05 | 77.78% | 100.00% | 8.16% | 95.000% | Target |
| SL17 | $14,737.05 | 87.75% | 100.00% | 27.80% | 95.000% | Target |
| SL19 | $14,737.05 | 100.00% | 100.00% | 100.00% | 95.000% | Target |
| SL20 | $14,737.05 | 89.29% | 100.00% | 50.85% | 95.000% | Target |
| SL21 | $64,943.02 | 100.00% | 100.00% | 100.00% | 95.000% | Target |
| SL22 | $35,368.92 | 100.00% | 100.00% | 100.00% | 92.000% | Target |
| SL23 | $14,737.05 | 99.35% | 100.00% | 98.59% | 90.000% | Target |
| SL24 | $17,664.46 | 99.22% | 99.90% | 98.61% | 99.000% | Target |
| SL25 | $14,737.05 | 99.91% | 100.00% | 99.77% | 99.000% | Target |
| SL26 | $14,737.05 | 99.10% | 100.00% | 97.14% | 90.000% | Target |
| SL27 | $11,789.64 | 96.97% | 100.00% | 88.40% | 95.000% | Target |
| SL28 | $11,789.64 | 97.58% | 100.00% | 93.99% | 90.000% | Target |
| SL29 | $5,894.82 | 99.73% | 100.00% | 97.79% | 90.000% | Target |
| SL30 | $23,579.28 | 96.40% | 100.00% | 87.06% | 90.000% | Target |

PREDICTIVE MODELING OF RISK FOR SERVICES IN A COMPUTING ENVIRONMENT

TECHNICAL FIELD

One or more aspects of the present invention relate to generating a predictive model for automated analysis of risk based on determined probabilities of service level failures.

BACKGROUND

The operability of an information technology infrastructure, such as a multi-user computing environment, is reliant on the various processes and services that operate within this framework, both maintaining and enhancing the framework, meeting certain requirements within certain constraints. These requirements can be referred to as service levels. The expected service levels are often tied to individual Service Level Agreements (SLA). The failure of an entity within the infrastructure to meet the Service Level can lead to issues with the infrastructure, affecting the efficacy as well as the efficiency of the infrastructure.

SUMMARY

Shortcomings of the prior art are overcome and additional advantages are provided through the provision of a method of generating a predictive model for automated risk analysis. The method includes, for instance: obtaining, by one or more processor, data related to a service level agreement for a service from a provider, wherein the service comprises providing, to a client, network resources from a shared pool of network resources in a computing environment; utilizing, by the one or more processor, the data to generate input parameters, wherein the input parameters comprise target parameters for the service level agreement, penalty parameters for the service level agreement, and statistical process control parameters; analyzing, by the one or more processors, the input parameters to model risk associated with probability of failure of the service from the provider, in the computing environment, and generating, by the one or more processor, a risk model; and based on the risk model, allocating, by the one or more processor, a portion of the network resources.

Shortcomings of the prior art are overcome and additional advantages are provided through the provision of a computer program product to generate a predictive model for automated risk analysis. The computer program product includes, for instance a computer readable storage medium readable by one or more processor and storing instructions for execution by the one or more processor for performing a method that includes: obtaining, by the one or more processor, data related to a service level agreement for a service from a provider, wherein the service comprises providing, to a client, network resources from a shared pool of network resources in a computing environment; utilizing, by the one or more processor, the data to generate input parameters, wherein the input parameters comprise target parameters for the service level agreement, penalty parameters for the service level agreement, and statistical process control parameters; analyzing, by the one or more processors, the input parameters to model risk associated with probability of failure of the service from the provider, in the computing environment, and generating, by the one or more processor, a risk model; and based on the risk model, allocating, by the one or more processor, a portion of the network resources.

Computer systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 5 depicts a workflow that illustrates aspects of an embodiment of the present invention;

FIG. 7 depicts an example of certain aspects of an embodiment of the present invention;

DETAILED DESCRIPTION

Figure 1:
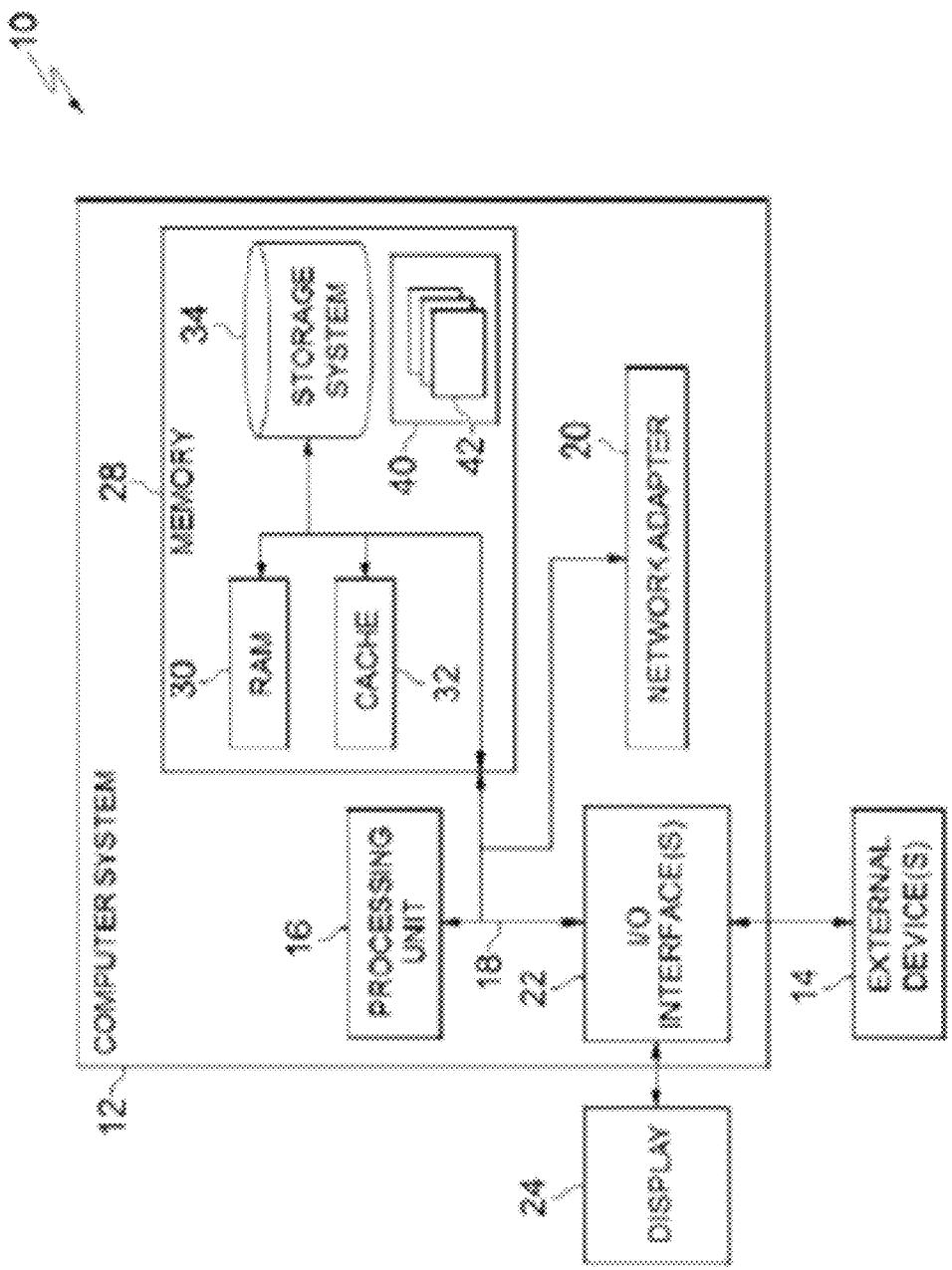
FIG. 1 depicts a cloud computing node, in accordance with one or more aspects set forth herein.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Services delivered within an existing computing architecture to enhance or maintain the architecture and/or services delivered to construct a technical architecture, including but not limited to a multi-user computing environment, must meet key measurements or include attributes, which can be understood as thresholds, targets, and/or benchmarks, in order to maintain the efficacy and efficiency of the environment and promote security and business continuity within the environment. In addition to the technological costs of failing to meet these thresholds, failing to attain these thresholds can also have a financial impact of the organizations and individuals tasked with maintaining the architecture and ensuring that it functions in accordance with certain targets. The thresholds that services are tasked with meeting in a computing environment can be referred to as Service Level Agreements (SLAs). When an SLA is not attained, the service provider may be tasked with paying a penalty. As a service provider integrates its offerings into different environments, entering into more than one SLA, the risk that the individual services will not meet the service levels within these varied computing environments increases the exposure, including the financial exposure, of the service provider. Additionally, when a service provider responsible for allocating resources within a shared computing environment fails to meet the SLA, users in the environment will experience issues in accessing the resources and the resources in the environment will not operate at the defined efficiency levels, which can lead to technical issues, including latency of the network.

Embodiments of the present invention improve the functionality of computing environments in which they are applied by detecting and diagnosing issues that would compromise both the efficacy and efficiency of the computer system if left unaddressed. An embodiment of the present invention responds to the issues detected and diagnosed by making changes in resource allocation to avoid these future issues. The limitations in tracking and diagnosing issues with processes and services within computing environments failing to meet targets defined in an SLA is a well-understood and routine issues compromise the functionality of computing environments. By providing not only a diagnostic tool, but also, reallocating resources in order to avoid anticipated issues and optionally also providing an interface that displays the anticipates issues, the one or more program 440 (e.g., FIG. 4) can assist a computing environment in avoiding and/or mitigating these anticipated issues.

Certain embodiments of the present invention provide an advantage to a Penalty Risk Assessment tool that helps the delivery organization identify the probability of paying one or more penalties based on failures related to SLAs, including predicting the expected losses to certain delivery teams. In an embodiment of the present invention, certain risks can be operationally defined as the financial value (e.g. dollars) of the combination of the contractual Service Level Agreement (SLA) penalty liability and the associated probability (P) of SLA failure: Risk=SLA Penalty Liability*P(SLA Failure).

Some embodiments of the present invention provide technical service providers with a consistent and repeatable method of calculating and modeling risks associated with and individual and/or a portfolio of SLAs. Aspects of certain embodiments of the present invention enable service providers to prioritize SLA penalty liability risks and preemptively take mitigating actions, including but not limited to, making changes to the allocations of network resources.

Some embodiments of the present invention provide the advantage of being an objective tool, not a subjective one, for modeling risks to service providers related to issues with meeting requirements defined in an SLA, thus, enabling these service providers to either avoid, and/or mitigate the risk of penalties defined in the SLAs, which include (SLA) Penalty Liability Risk. Additionally, embodiments of the present invention offer a complete analysis, including a consistent analysis, of the risks associated with an SLA when providing technical services within a given technical architecture. Embodiments of the present invention also model the risks they determine in an easily understood manner, simplifying the complexity of the risks associated with an individual and/or a portfolio of SLAs.

Figure 4:
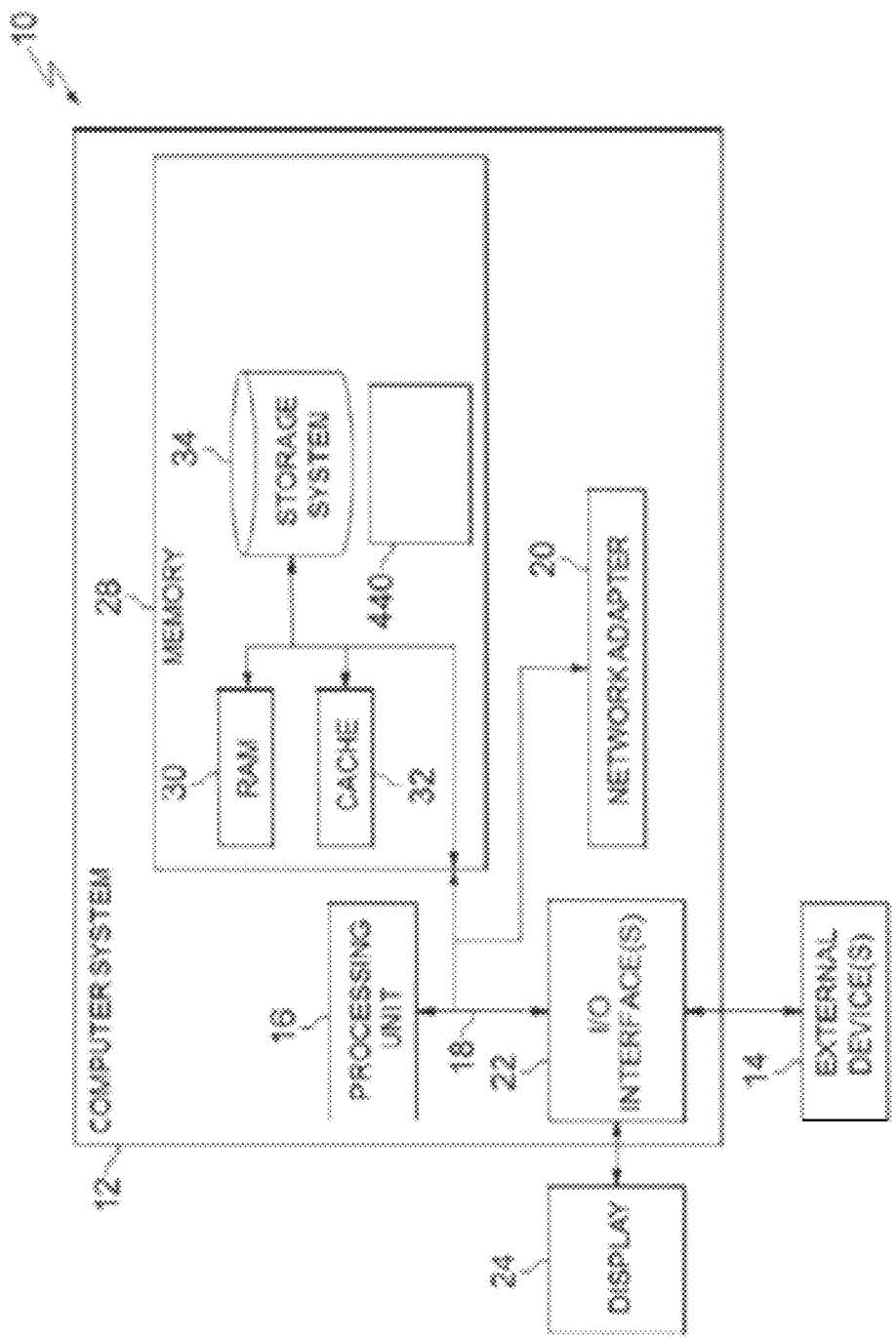
FIG. 4 depicts a hardware overview of a computing node, in accordance with one or more aspects of the present invention.

Aspects of certain embodiments of the present invention utilize predictive analytics on SLA attainment performance over time and probabilistic modeling to perform a risk assessment of future performance In an embodiment of the present invention, one or more program 440 (e.g., as illustrated in FIG. 4) executed by a processing resource of a computer system 12 (FIG. 4) analyzes performance metrics related to an SLA for a particular service within a given technical architecture and determined a probability for service level failure. In an embodiment of the present invention, one or more program 440 multiplies the determined probability by a penalty liability in order to annualize the risk results in a realistic representation of financial impact over certain metrics, including but not limited to, time.

As aforementioned, an SLA defines the level of performance committed to the customer by a supplier and penalties may be incurred by the supplier when the SLA is not met. The supplier's delivery capability can be characterized through statistical process control. Embodiments of the present invention determined the likelihood of a given supplier missing an SLA based upon past performance. By combining the delivery capability with the associated penalty likelihood, one or more program 440, creates a predictive risk model. A benefit of this predictive risk model is that it enables improved prioritization by providing a service provider utilizing aspects of the present invention with the ability to compare risks to remediation costs.

In order to consistently model and predict exposure to service providers who offer services in a variety of different technical environments, the present invention provides information to suppliers that enable the suppliers to make Service Level modifications based on process measurements by one or more program 440. One or more program 440 in an embodiment of the present invention may identify performance distributions related to a given SLA. One or more program 440 simulates process performance prior to actual implementation of the process execution. One or more program 440 may measure delivery capability with statistical process controls (e.g., Shewhart style control charts). One or more program 440 may analyze various factors and present a comprehensive and objective conclusion that quantifies trade-offs between the provider and the consumer of the services and the risks to each, based on anticipated performance of a given service.

Advantages of certain embodiments of the present invention may be realized in multi-user and multi-entity computing environments. As computing models become more complex and a given architecture is serviced by more providers, in a multi-faceted environment, the exposure of the technical architecture to computing issues due to the failure of certain provider can be magnified as the systems are sometimes largely interdependent. Being able to predict and mitigate issues based on metrics being missed, in accordance with an embodiment of the present invention, is an advantage that may be realized in these complex environments, including but not limited to, cloud computing environments. By utilizing the distribution model of a cloud computing environment, a service provider may also distribute its services over a wide range of clients. This increased user base may translate to increased risk, particularly if different clients are serviced at different SLAs. The service provider can utilize aspects of embodiments of the present invention in order to monitor its offerings to various clients who access the services via a cloud node in the cloud computing environment. A service provider may utilize an embodiment of the present invention to change allocations of resources in a cloud computing environment to avoid issues predicted by the risk model.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment being services now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out, and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
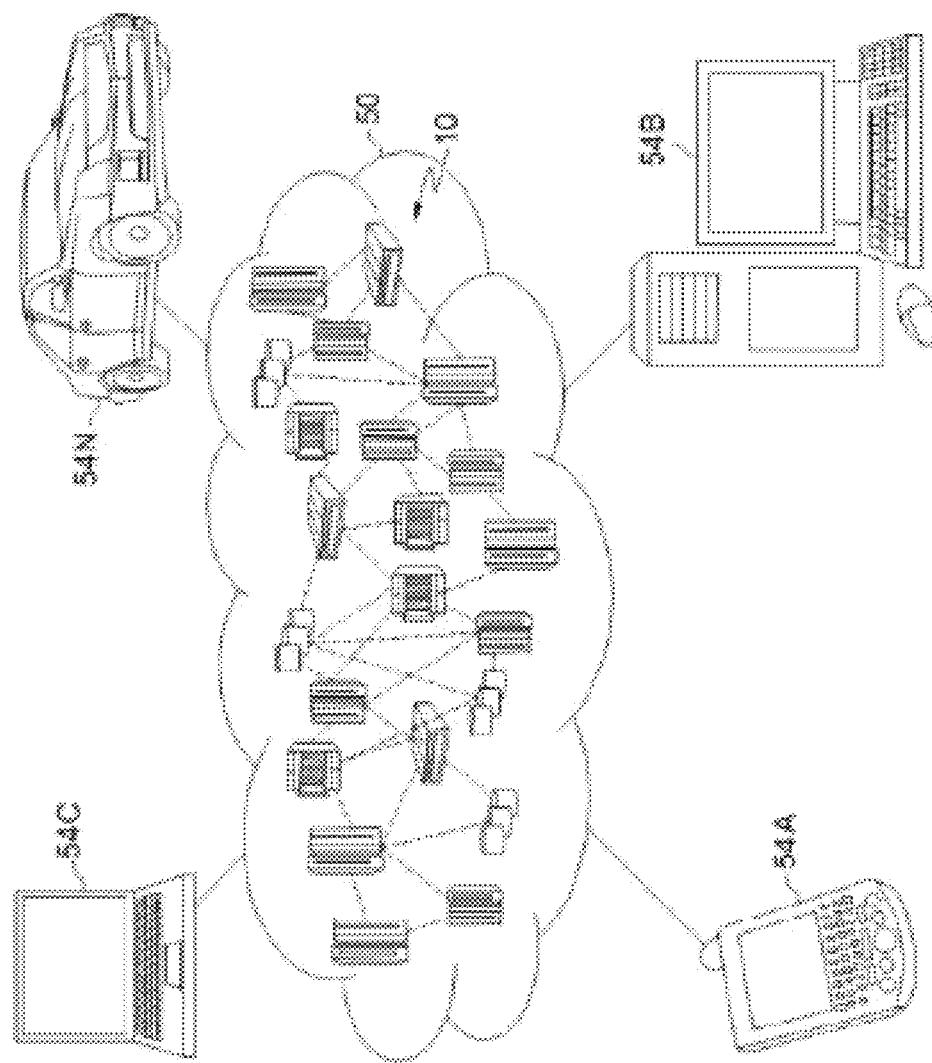
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
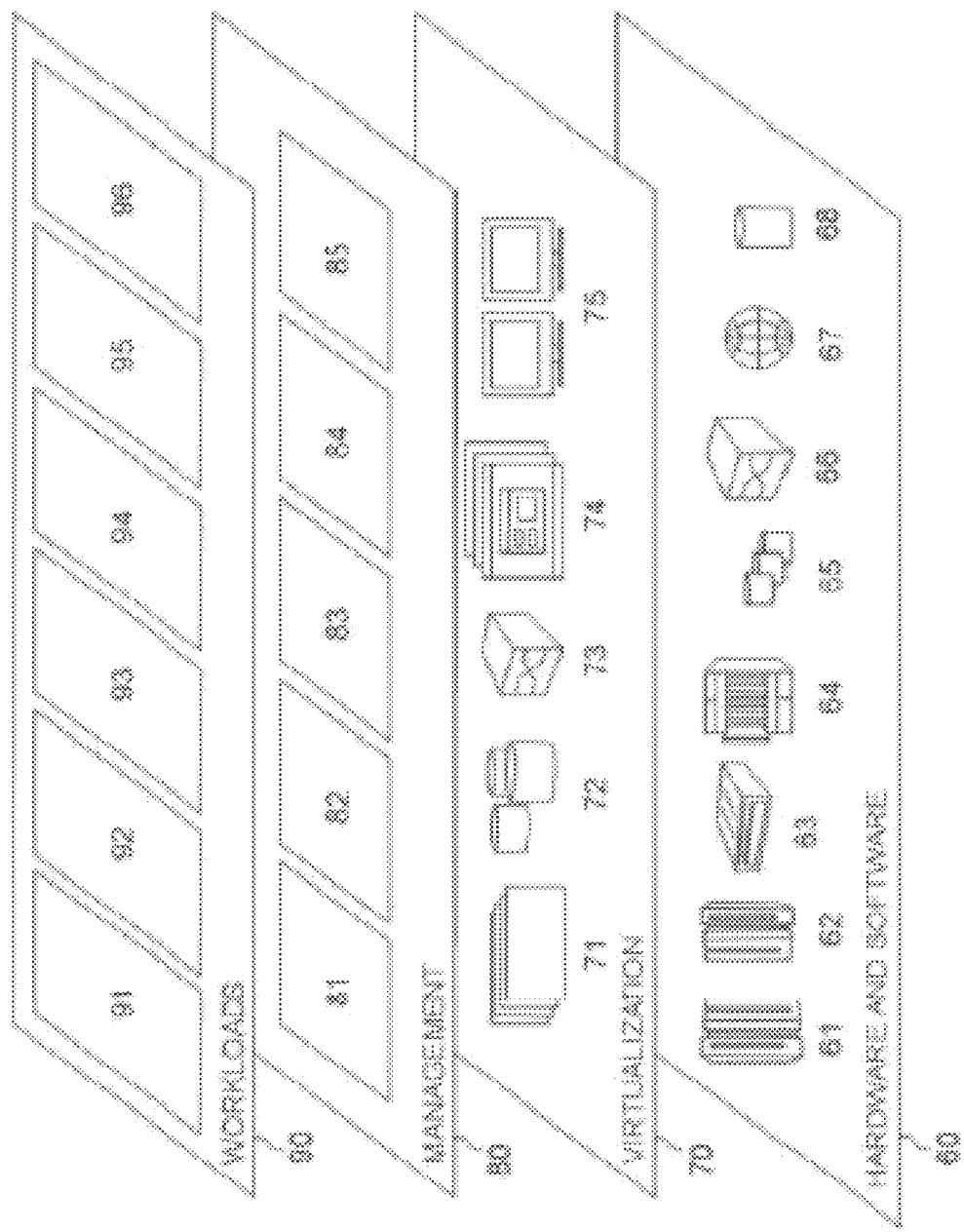
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a predictive model for automated analysis of risk based on determined probabilities of service level failures 96, as described herein. Element 96 can be understood as one or more program 440 described in FIG. 4.

FIG. 4 depicts a hardware overview of a computing node 10, in accordance with one or more aspects set forth herein.

Program/utility 40 as set forth in FIG. 1 can include one or more program 440 as set forth in FIG. 4, and program/utility 40, including, for example one or more program 440 to evaluate the efficacy of the communications between one or more entities when transferring task ownership between these entities, as described in work layer 96. Program/utility 40 as set forth in FIG. 1 can optionally include additional programs.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 5 is a workflow 500 that depicts aspects of certain embodiments of the present invention. As illustrated by FIG. 5, an embodiment of the present invention includes a method for assessing the risks associated with a given service within a computing environment being services based on service level targets for the given service, which may also be understood as benchmarks. In an embodiment of the present invention, the service level targets are defined in an SLA.

Referring to FIG. 5, in order to assess the risk of a given service not meeting the service level targets of an SLA in a given computing environment, one or more program 440 (FIG. 4), for the given service level target (e.g., benchmark) in the computing environment in an associated SLA, obtains attributes of the SLA defining the service level targets required to meet the SLA (510). In an embodiment of the present invention, the one or more program 440 obtains historical performance data related to the given service for a predefined period of time (520). In an embodiment of the present invention, this historical performance data obtained by the one or more program 440 may span at least six (6) months. In an embodiment of the present invention, historical performance data may include data relating to SLAs with different attributes and historical performance data in various computing environments. In an embodiment of the present invention, the one or more program 440 obtains data related to any contractual penalty liability for the SLA (530).

In an embodiment of the present invention, the one or more program 440 identifies the capabilities of a supplier of the service (540). The one or more program 440 may identify these capabilities utilizing a statistical process control analysis, also referred to as a process behavior analysis.

In an embodiment of the present invention, the one or more program 440 creates a risk model based on the process capabilities and the contractual penalty liability (550). In an embodiment of the present invention, the risk model may include a financial risk model that represents financial liabilities associated with the predicted probabilities of a given service provider not meeting the SLA requirement associated with the service that this provider is providing in a given computing environment. The one or more program 440 utilizes the model to quantify the risk, including but not limited to, the financial risk, of the SLA (560). Based on this model and the understood risk, a user of the system can make continual improvement investment decisions.

In an embodiment of the present invention, the one or more program 440 can evaluate risks associated with multiple services under multiple SLAs at one time. In this embodiment, the one or more program 440 can utilize the resultant model to rank the risks associated with various SLAs, which will further inform system-wide continual improvement investment decisions.

Figure 6:
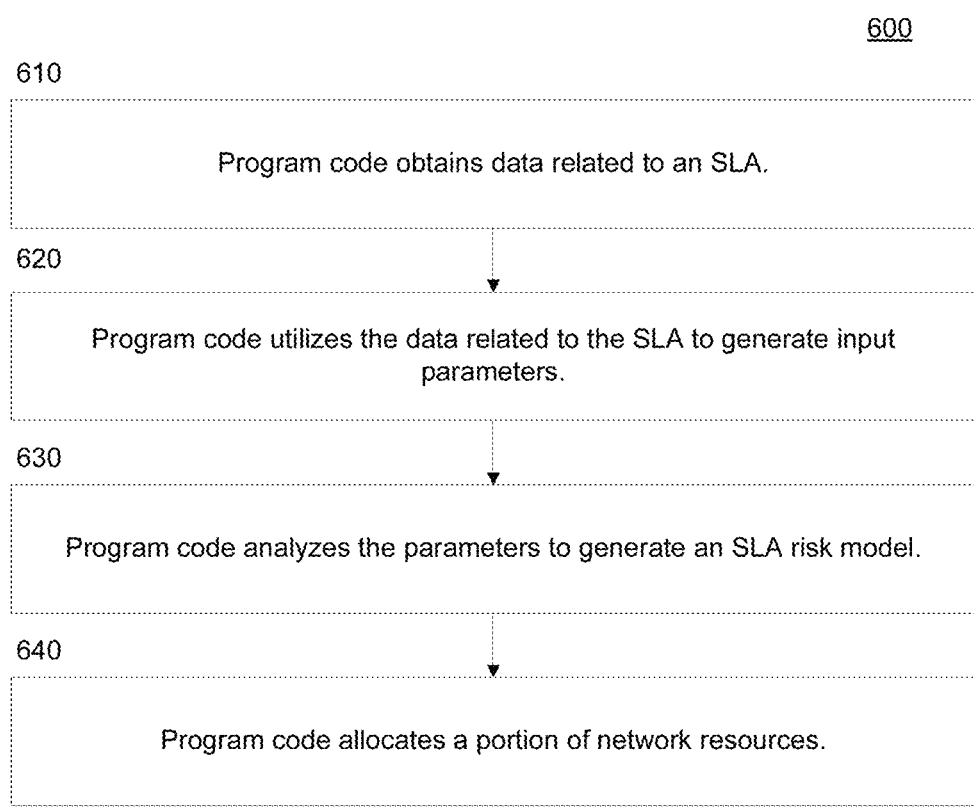
FIG. 6 depicts a workflow that illustrates aspects of an embodiment of the present invention.

Like FIG. 5, FIG. 6 also depicts a workflow 600 of an embodiment of the present invention. In an embodiment of the present invention, one or more program 440 obtains data related to an SLA (610). The data related to an SLA may include: 1) an SLA target parameters, i.e., the conditions required for a service to meet the SLA; 2) SLA penalty parameters, which include penalty liability for an SLA miss, i.e., description of penalties if SLA is not met; and 3) SLA performance data, i.e., historical data related to the current SLA in the current computing environment and SLAs for the same service in different computing environments. In an embodiment of the present invention, at least a portion of the data related to the SLA may be input by a user through a graphical user interface. In an embodiment of the present invention the service includes providing, to a client, network resources from a shared pool of network resources in a computing environment. In an embodiment of the present invention, the computing environment is a shared computing environment.

In an embodiment of the present invention, the one or more program 440 generates a graphical user interface that includes options for a user to enter data including but not limited to, the following: SLAs by name, data points that contribute to a principle-based approach risk assessment for predefined period of time (e.g., daily, monthly, quarterly, yearly), SLA penalty data, and/or data representing exceptions for given SLAs that differ from the penalty data. Through the graphical user interface, the user may be able to trigger the one or more program 440 to create a representation, including but not limited to a slide deck, containing penalty-bearing SLAs with exceptions based on the data obtained by the one or more program 440 via user entry into the graphical user interface. Through the graphical user interface, the user may be able to trigger the one or more program 440 to generate graphical representations of the data entered, including but not limited to generic shapes such as callout boxes, bubbles, and lines. Through the graphical user interface, the user may be able to trigger the one or more program 440 to generate a risk assessment based upon the data entered. Through the graphical user interface, the user may be able to trigger the one or more program 440 to create a graphical representation and/or a visual model of the risk assessment, including but not limited to, a slide deck.

Returning to FIG. 6, in an embodiment of the present invention, the one or more program 440 utilizes the data related to the SLA to generate input parameters (620). In generating these parameters, the one or more program collates SLA target and penalty parameters and determines statistical process control parameters. Hence, the parameters may include target parameters, penalty parameters, and statistical process control parameters. In an embodiment of the present invention, the one or more program 440 utilizes statistical process control to understand the process capability based on past performance; upper natural process limit (UNPL), lower natural process limit (LNPL), mean and target are examples of analysis parameters in statistical process control. The one or more program 440 generates these parameters based on the data obtained. In an embodiment of the present invention, the one or more program 440 utilizes this analysis to generate input parameters for each SLA. FIG. 7 depicts an example of input parameters for various SLAs 710 that the one or more program 440 may generate in an embodiment of the present invention. As seen in FIG. 7, in an embodiment of the present invention, input parameters may include attainment mean 730, UNPL 740, LNPL 750, and/or minimum target 760. FIG. 7 also depicts a quantification of the monthly risk, which may include a financial quantification of the monthly risk, by the one or more program 440, as shown as the amount of risk each month 720. FIG. 7 also utilizes an indicator 770 as a method of quickly representing the probability of exposure for a given service, based on predictions related to the SLA. In an embodiment of the present invention, the indicator represents whether a service level target is a limit i.e., an upper bound or a target, i.e., a lower bound.

In an embodiment of the present invention, the one or more program 440 analyzes the parameters to generate an SLA risk model (630). In an embodiment of the present invention, the risk model is a probabilistic financial risk model that quantifies the delivery capability for a service provider for a given service under an SLA. In an embodiment of the present invention, the one or more program 440 generates the SLA risk model in part by determining the monthly probability of failure by SLA, for each SLA for which the one or more program 440 obtained data and generated parameters. Table 1 illustrates monthly probability failures by SLA, which one or more program 440 determines as part of generating a risk model, in an embodiment of the present invention. Table 1 shows an SLA Penalty Amount that is calculated as a monthly value, however, this is offered merely as an example of a predefined period of time for which the one or more program 440 may generate a risk analysis.

TABLE 1

| SLA ID Number | Estimated Annual Penalty Liability ($) | Calculated Monthly Failure Probability (%) | SLA Penalty Amount (Monthly) ($) |
| --- | --- | --- | --- |
| SL74a | 167,759.13 | 79.1 | 17,684.46 |
| SL79 | 141,475.68 | 100.0 | 11,789.64 |
| SL80 | 141,475.68 | 100.0 | 11,789.64 |
| SL16 | 135,231.00 | 76.5 | 14,737.05 |
| SL20 | 118,848.82 | 67.2 | 14,737.05 |
| SL17 | 113,466.77 | 64.2 | 14,737.05 |
| SL32 | 105,769.23 | 59.8 | 14,737.05 |
| SL48 | 84,384.63 | 47.7 | 14,737.05 |
| SL68 | 83,446.52 | 47.2 | 14,737.05 |
| SL66 | 43,642.78 | 24.7 | 14,737.05 |
| SL27 | 34,672.01 | 24.5 | 11,789.64 |
| SL92 | 32,669.27 | 18.5 | 14,737.05 |
| SL24 | 25,731.49 | 12.1 | 17,684.46 |
| SL89 | 21,681.58 | 12.3 | 14,737.05 |
| SL57 | 17,920.70 | 10.1 | 14,737.05 |
| SL30 | 5,627.97 | 2.0 | 23,579.28 |
| SL59 | 5,265.99 | 3.0 | 14,737.05 |
| SL91a | 4,690.18 | 2.7 | 14,737.05 |
| SL90 | 1,958.94 | 0.6 | 29,474.10 |
| SL81 | 1,285.44 | 1.8 | 5,894.82 |

In an embodiment of the present invention, based on the risk model, the one or more program 440 allocates, by the one or more processor, a portion of the network resources (640). In one non-limiting example, an SLA may define the target levels for a given user (individual/organization/client) for the performance of network resources in a given computing environment. Based on elements of the risk model predicting issues with meeting the targets with the group of network resources currently allocated to the given user, the one or more program 440 may allocate additional network resources to the user in order to mitigate the risk. Whether or not the one or more program 440 allocates additional network resources (or computing resources in general) to a given user is based on the risk model and the risks associated with failing to meet the targets defined in the SLA for the given user. By changing the allocations of resources within the computing environment, the one or more program 440 can maintain the service levels and hence, the efficiencies of the environment. Thus, one advantage of embodiments of the present invention is that they are an improvement resource allocation within a shared computing environment.

Figure 8:
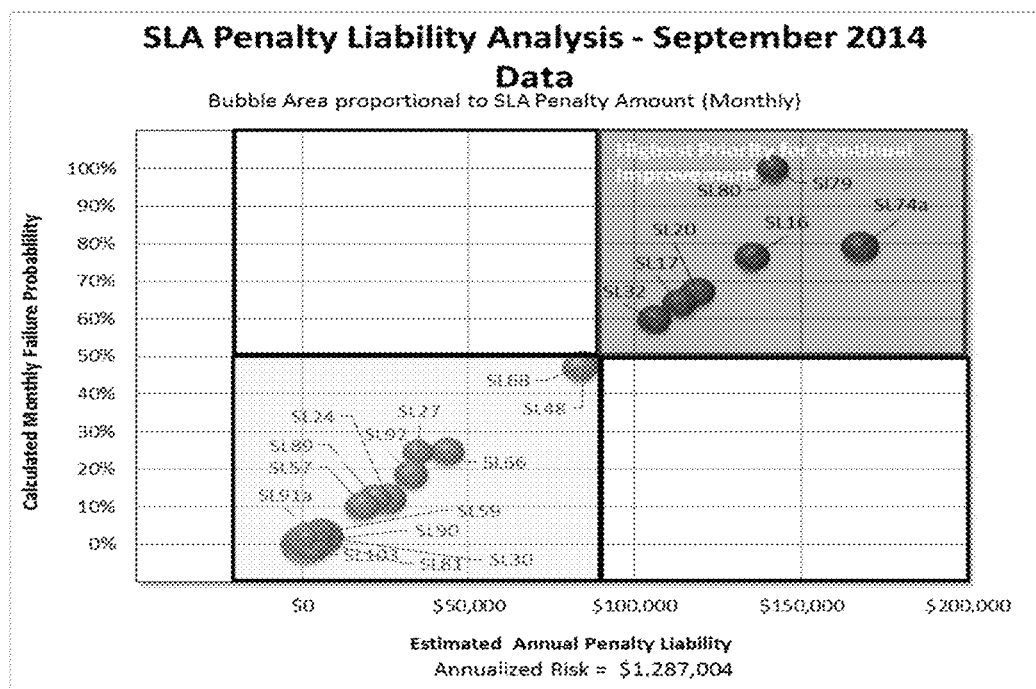
FIG. 8 depicts an example of a visual representations of risk generated by an embodiment of the present invention.
Figure 9:
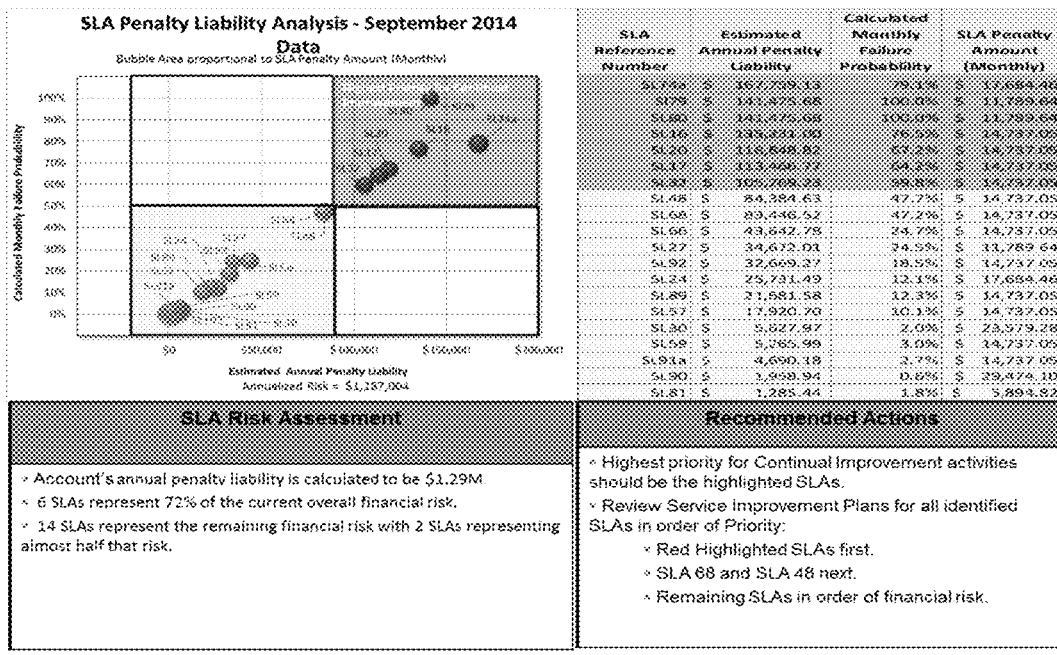
FIG. 9 depicts an example of a visual representations of risk generated by an embodiment of the present invention.

In an embodiment of the present invention, the one or more program 440 displays the SLA risk model such that it is viewable through a graphical user interface on a client. By displaying the model, the one or more program 440 visually prioritizes issues identified and may also identify improvement activities that can eliminate and/or mitigate the risks identified. FIGS. 8-9 are both examples of visual representations of risk assessments. The one or more program 440 may create and display a visual such as FIG. 8 to visually prioritize improvement activities. Meanwhile, the one or more program 440 may generate and display a visual such as FIG. 9 from a final report template. A visual like that depicted as FIG. 9 allows for the user to capture a verbal summary of the results along with next steps. In an embodiment of the present invention, one or more of these visuals in a graphical user interface would enable a user to identify the performance/penalty trade-offs for each SLA.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    obtaining, by one or more processor, first data related to a service level agreement for a service from a provider, wherein the service comprises providing, to a first client, a first portion of network resources from a shared pool of network resources in a computing environment;
    utilizing, by the one or more processor, the first data to generate first input parameters, wherein the first input parameters comprise first target parameters for the service level agreement, first penalty parameters for the service level agreement, and first statistical process control parameters;
    analyzing, by the one or more processors, the first input parameters to model risk associated with probability of failure of the service from the provider, in the computing environment, and generating, by the one or more processor, a first risk model;
    obtaining, by one or more processor, second data related to at least one additional service level agreement for at least one additional service from the provider, wherein the at least one additional service comprises providing, concurrently with the service provided to the first client, to at least one additional client, a second portion of the network resources from the shared pool of network resources in the computing environment;
    utilizing, by the one or more processor, the second data to generate second input parameters, wherein the second input parameters comprise second target parameters for the at least one additional service level agreement, second penalty parameters for the at least one additional service level agreement, and second statistical process control parameters;
    analyzing, by the one or more processors, the second input parameters to model risk associated with probability of failure of the at least one additional service from the provider, in the computing environment, and generating, by the one or more processor, a second risk model;
    automatically quantifying, by the one or more processor, risk associated with probability of failure of the service as related to risk associated with probability of failure of the at least one additional service; and
    based on the first risk model and the risk associated with the probability of the failure of the service as related to the second risk model and the risk associated with the probability of the failure of the at least one additional service, allocating, by the one or more processor, a portion of the network resources from the shared pool of network resources in the computing environment to one of: the a first client to mitigate the risk associated with the probability of failure of the service, or to the at least one additional client, to mitigate the risk associated with the probability of failure of the at least one additional service.

2. The method of claim 1, further comprising:
    displaying, by the one or more processor, the first risk model such that it is viewable in a graphical user interface on a client in the computing environment.

3. The method of claim 1, wherein the first data related to the service level agreement comprises historical performance data for the service from the provider.

4. The method of claim 1, wherein the utilizing the first data to generate first input parameters comprises collating the first risk model first risk model target parameters with first risk model penalty parameters.

5. The method of claim 2, wherein the first statistical process control parameters are based on the historical performance data.

6. The method of claim 1, wherein the first statistical process control parameters comprise at least one of: upper natural process limit, lower natural process limit, mean or target.

7. The method of claim 1, wherein the first data comprise attributes of the service level agreement defining targets required to meet the service level agreement.

8. The method of claim 3, wherein the historical performance data comprise timestamps from a predefined time period.

9. The method of claim 1, wherein the first data comprise potential penalty liability data related to the service level agreement.

10. The method of claim 1, wherein the utilizing the first data to generate first statistical process control parameters comprises identifying capabilities of the provider based on a portion of the first data.

11. The method of claim 1, wherein the first portion of network resources and the second portion of network resources comprise a common network resource from the shared pool of network resources in the computing environment.

12. A computer program product comprising:
    a computer readable storage medium readable by one or more hardware processor and storing instructions for execution by the one or more processor for performing a method comprising:
        obtaining, by the one or more processor, first data related to a service level agreement for a service from a provider, wherein the service comprises providing, to a first client, a first portion of network resources from a shared pool of network resources in a computing environment;
        utilizing, by the one or more processor, the first data to generate first input parameters, wherein the first input parameters comprise first target parameters for the service level agreement, first penalty parameters for the service level agreement, and first statistical process control parameters;
        analyzing, by the one or more processors, the first input parameters to model risk associated with probability of failure of the service from the provider, in the computing environment, and generating, by the one or more processor, a first risk model;
        obtaining, by one or more processor, second data related to at least one additional service level agreement for at least one additional service from the provider, wherein the at least one additional service comprises providing, concurrently with the service provided to the first client, to at least one additional client, a second portion of the network resources from the shared pool of network resources in the computing environment;
        utilizing, by the one or more processor, the second data to generate second input parameters, wherein the second input parameters comprise second target parameters for the at least one additional service level agreement, second penalty parameters for the at least one additional service level agreement, and second statistical process control parameters;

analyzing, by the one or more processors, the second input parameters to model risk associated with probability of failure of the at least one additional service from the provider, in the computing environment, and generating, by the one or more processor, a second risk model;

automatically quantifying, by the one or more processor, risk associated with probability of failure of the service as related to risk associated with probability of failure of the at least one additional service; and based on the first risk model and the risk associated with the probability of the failure of the service as related to the second risk model and the risk associated with the probability of the failure of the at least one additional service, allocating, by the one or more processor, a portion of the network resources from the shared pool of network resources in the computing environment to one of: the a first client to mitigate the risk associated with the probability of failure of the service, or to the at least one additional client, to mitigate the risk associated with the probability of failure of the at least one additional service.

13. The computer program product of claim 12, the method further comprising:

displaying, by the one or more processor, the first risk model such that it is viewable in a graphical user interface on a client in the computing environment.

14. The computer program product of claim 12, wherein the first data related to the service level agreement comprise historical performance data for the service from the provider.

15. The computer program product of claim 12, wherein the utilizing the first data to generate first input parameters comprises collating first target parameters with first penalty parameters.

16. The computer program product of claim 14, wherein the first statistical process control parameters are based on the historical performance data.

17. The computer program product of claim 12, wherein the first statistical process control parameters comprise at least one of: upper natural process limit, lower natural process limit, mean or target.

18. The computer program product of claim 12, wherein the first data comprise attributes of the service level agreement defining targets required to meet the service level agreement.

19. A system comprising:

a memory;

one or more hardware processor in communication with the memory; and program instructions executable by the one or more processor via the memory to perform a method, the method comprising:

obtaining, by the one or more processor, first data related to a service level agreement for a service from a provider, wherein the service comprises providing, to a first client, a first portion of network resources from a shared pool of network resources in a computing environment;

utilizing, by the one or more processor, the first data to generate first input parameters, wherein the first input parameters comprise first target parameters for the service level agreement, first penalty parameters for the service level agreement, and first statistical process control parameters;

analyzing, by the one or more processors, the first input parameters to model risk associated with probability of failure of the service from the provider, in the computing environment, and generating, by the one or more processor, a first risk model;

obtaining, by one or more processor, second data related to at least one additional service level agreement for at least one additional service from the provider, wherein the at least one additional service comprises providing, concurrently with the service provided to the first client, to at least one additional client, a second portion of the network resources from the shared pool of network resources in the computing environment;

utilizing, by the one or more processor, the second data to generate second input parameters, wherein the second input parameters comprise second target parameters for the at least one additional service level agreement, second penalty parameters for the at least one additional service level agreement, and second statistical process control parameters;

analyzing, by the one or more processors, the second input parameters to model risk associated with probability of failure of the at least one additional service from the provider, in the computing environment, and generating, by the one or more processor, a second risk model;

automatically quantifying, by the one or more processor, risk associated with probability of failure of the service as related to risk associated with probability of failure of the at least one additional service; and based on the first risk model and the risk associated with the probability of the failure of the service as related to the second risk model and the risk associated with the probability of the failure of the at least one additional service, allocating, by the one or more processor, a portion of the network resources from the shared pool of network resources in the computing environment to one of: the a first client to mitigate the risk associated with the probability of failure of the service, or to the at least one additional client, to mitigate the risk associated with the probability of failure of the at least one additional service.

20. The system of claim 19, the method further comprising:

displaying, by the one or more processor, the first risk model such that it is viewable in a graphical user interface on a client in the computing environment.

* * * * *